United States Patent Office 3,701,668
Patented Oct. 31, 1972

3,701,668
COMPOSITION FOR IMPROVING BREAD
MAKING AND TEXTURE
Lewis D. Morse, 133 Snowden Lane, Princeton, N.J. 08540, and Paul A. Hammes, 1886 Lamberts Mill Road, Westfield, N.J. 07090
No Drawing. Filed June 9, 1970, Ser. No. 44,881
Int. Cl. A21d 2/06, 2/10
U.S. Cl. 99—91                    1 Claim

ABSTRACT OF THE DISCLOSURE

A composition for addition to bread dough to improve the texture of the bread produced therefrom is an aqueous solution of ascorbic acid or its equivalent which is solubilized in a hydrocarbon by the solubilizing action of micelles formed by a surfactant.

PRIOR ART

Mentioned in specification.

RELATED CASE

Ser. No. 20,402 filed on Mar. 17, 1970 by these inventors jointly with Charles W. Everson.

This invention relates to bread making and particularly to a novel preparation for introducing into the dough certain agents which are known to improve the texture of the resulting baked bread. The word bread is used herein to include not only loaves of bread but buns, rolls, pastries and like bakery products made from yeast leavened dough.

The bread improving agents which are to be added to the dough in accordance with the present invention are reducing agents such as ascorbic acid and short chain, i.e. 6 to 8 carbon atoms, aliphatic hydrocarbons such as hexane. As both of them are to be added to the dough, a simplified procedure would be to make a premix of them and then add a measured amount of the premix to the dough. However, their combined inclusion in a premix creates a problem because ascorbic acid is water soluble but not soluble in the hydrocarbon.

The present invention provides a combined product of these to agents. This product is a water solution of the ascorbic acid which is enclosed in minute micelles formed by surfactants, the surfactants themselves being in solution in the hydrocarbon. This product of the invention, therefore, is a premix which can be measured out for addition to the dough to supply it with both ascorbic acid and the selected hydrocarbon.

The importance in bread making of the ascorbic acid and the hydrocarbon may first be pointed out. The value of ascorbic acid as a bread dough additive is disclosed in an article by H. Jorgensen entitled "Studies on the Nature of the Bromate Effect": appearing on page 193 of the Oxford University Press (London) 1945. A general review of this and later discoveries concerning the value of adding ascorbic acid to bread dough is in an article by R. E. Manseth and Johnson entitled "Ascorbic Acid Treated Flour" 'in the October 1968 issue of The Baker's Digest. It is there pointed out, as well as in several of the references cited therein, that the ascorbic acid appears to act as a reducing agent. This effect of the ascorbic acid may be increased if it is combined with known edible oxidizing agents such as potassium bromate, but such addition is not necessary in practicing the present invention.

Ascorbic acid is referred to above because it is the most commonly used reducing agent added to dough. The invention includes the use of other reducing agents represented by ascorbic acid isomers such as 1-ascorbic acid and d-araboascorbic acid as is mentioned in Patent 3,304,183 and in the Manseth and Johnson article. The ene-diol compound which are used in the meat processing industry may be used as well. Another reducing agent which may be used in practicing the invention is cysteine.

The selected reducing agent is added in the amount of from 10 to 200 parts per million based on the flour weight. It serves to reduce the mixing speed requirements of the dough especially in a continuous dough making process.

The benefits derived from adding hexane to bread dough are described in an article by J. G. Pone, Jr. entitled "Modification of Dough Properties by Organic Solvents" which is in volume 13, No. 10, Cereal Science Today, 364–370 (October 1968). The grain appearance of the bakery article is markedly improved by the addition of 2.0 to 10.0 milligram moles of the hydrocarbon per 100 grams of the flour. It is suggested in that article that the effectiveness of the hydrocarbons is because they promote the binding of other dough components. A proposed explanation of this is that protein lipids and phosphorus are bound in going from flour to dough. This tends toward a "tighter" or more rigid structure within the dough with the result that smaller trapped air cells are formed and these cells cannot rupture or coalesce as readily. The article points out that hexane, heptane and octane are most effective and these are to be used as the hydrocarbons in practicing the present invention.

It has been stated above that the feature of this invention is the formation of micelles by a surfactant which is in solution in the selected hydrocarbons and the entrapment within this surfactant micelle of a water solution of the ascorbic acid or its equivalent. The formation of these micelles is disclosed in detail in our pending patent application Ser. No. 20,402 (Case 13,602) filed jointly with Charles W. Everson on Mar. 17, 1970 and the above disclosure is incorporated herein by this reference.

In brief, it is there pointed out that if surfactants, i.e. those having both hydrophobic and hydrophilic groups are dissolved in a non-aqueous solvent in a concentration at least as great as the CMC (critical micelle concentration) the selected surfactant forms micelles. The present, generally accepted explanation of this formation is that the hydrophilic groups are clustered toward or aggregated at the center of each micelle. This aggregation of the hydrophilic groups at the center of the micelle will absorb and retain the water solution of ascorbic acid (or its equivalent isomer). This is the important aspect of this invention as the hydrocarbon insoluble ascorbic acid is in fact solubilized in the hexane (or heptane or octane) and this product can be added to the bread dough to supply the dough with both ingredients.

The above-mentioned patent application Ser. No. 20,-402 includes in its generic disclosure the subject matter of the present application. The present application has been filed to divide out and to expand the specific use in the bakery industry of the solubilizing technique of Ser. No. 20,402, because of its particular advantage in producing better breads, buns, rolls, pastries, etc.

The surfactant which is to be used can be selected from the list on pages 3 and 4 of Ser. No. 20,402 namely:

dioctyl sodium sulfosuccinate
triglycerol monooleate
decaglycerol dioleate
ethoxylated stearic acid
caprylic acid
lecithin
n-dodecylamine caproate
n-octadecylamine caproate
hexanolamine oleate
hexanolamine caproate
α-monocaprin
α-monolaurin
α-monomyristin α-monostearin
zinc caprylate
zinc laurate, or Ni, Mg, Cu
zinc myristate
zinc stearate
dinonylnaphthalene sulfonate
tripentylmethylbenzene sulfonate
polyethylene nonylphenol ether
dodecyl ammonium butyrate
dodecyl ammonium propionate The selected one can be used in amount at least as great as its CMC as mentioned above and below its MAC (maximum additive concentration). A preferred amount is from 0.5 to 20 grams per 100 ml. of the selected hydrocarbon.

The reducing agent, i.e. the ascorbic acid or its isomer, is added as a water solution and any amount up to its saturated concentration may be used. This preferably is a 20% by weight concentration but a 10 to 40% concentration will give good results. The amount of the water solution should not exceed the volume which will be retained by the aggregates formed by the hydrophillic group at the centers of the micelles. A workable range, per 100 ml. of the hydrocarbon is from 0.5 to 20 grams of the 20% solution of the reducing agent, or the required amount of a 10 to 40% solution to give the same amount of the reducing agent.

In adding the composition of this invention to the bread and basing it on 100 grams of the flour used in making the dough, from 0.075 to 2.5 ml. and preferably 0.6 ml. of the hydrocarbon and its solubilized reducing agent would be used. The dough would then contain, per 100 grams of its flour content, from about 0.07 to 2.25 ml. of the hydrocarbon and from 1 to 20 mg. of ascorbic acid, and preferably around 4 mg.

Representative examples are the following:

EXAMPLE 1

7.3 ml. n-heptane and 0.5 gm. sodium dioctyl sulfosuccinate were stirred to a single phase system (I). 0.55 ml. 20% aqueous ascorbic acid was added dropwise with stirring to (I) to form a single phase system (II).

At initial assay, the concentration of ascorbic acid was 14.92 mg./ml. (II). At one week, the assay was 13.6 mg./ml. (II). At two weeks, the assay was 12.6 mg./ml. (II).

EXAMPLE 2

7.6 ml. n-hexane and 0.5 gm. sodium dioctyl sulfosuccinate were stirred to a single phase system (I). 0.55 ml. 20% aqueous ascorbic acid was added dropwise with stirring to (I) to form a single phase system (II).

At initial assay, the concentration of ascorbic acid was 14.62 mg./ml. (II). At one week, the assay was 13.5 mg./ml. (II). At two weeks, the assay was 12.3 mg./ml. (II).

EXAMPLE 3

0.5 gm. sodium dioctyl sulfosuccinate was dissolved in 5.0 gm. n-heptane to yield a single phase system (I). 2.0 gm. ascorbic acid was dissolved in 8.0 gm. 80% aqueous glycerine to form a clear solution (II). 0.55 ml. (II) was added dropwise with stirring to (I) to form a single phase system (III).

At initial assay the concentration of ascorbic acid was 14.35 mg./ml. (III). At ten days, the assay was 13.2 mg./ml. (III).

EXAMPLE 4

0.5 gm. sodium dioctyl sulfosuccinate was dissolved in 5.0 gm. n-hexane to yield a single phase system (I). 2.0 gm. ascorbic acid was dissolved in 8.0 gm. 80% aqueous glycerine to form a clear solution (II). 0.55 ml. (II) was added dropwise with stirring to (I) to form a single phase system (III).

At initial assay the concentration of ascorbic acid was 14.38 mg. ascorbic acid/ml. (III). At ten days, the assay was 13.2 mg./ml. (III). At 24 days, the assay was 12.35 mg./ml. (III).

EXAMPLE 5

1.0 gm. sodium dioctyl sulfosuccinate was dissolved in 60 gm. n-heptane to yield a single phase system (I). 0.6 gm. 20% aqueous ascorbic acid was added dropwise with stirring to (I) to form a single phase system (II).

A dough mix (III) was prepared by adding the following materials to the bowl of a 20 qt. bench type, 3-speed Hobart with McDuffee bowl attachment:

|  | Gm. |
|---|---|
| Patent flour (high protein) | 1000 |
| Water | ¹ 660 |
| Yeast | 25 |
| Mineral yeast food | 5 |
| Sucrose | 40 |
| Shortening | 40 |
| Milk solids (non-fat) | 40 |
| Sodium chloride | 20 |
| System II (of this example) | 6.06 |

¹ At temperature for dough to reach 82° C. after mixing.

This last ingredient was added just before mixing, and in a quantity to provide 0.6% n-heptane and 10. p.p.m. ascorbic acid, both on the basis of the 1000 gm. flour.

(III) was mixed for two minutes in first gear and 14 minutes in second gear. The resultant dough was fermented for two hours at 85° F. 550 gm. pieces of dough were scaled, rounded, rested for twenty minutes, moulded and panned, proofed to height, and baked for twenty-five minutes at 415° F. Experimental loaves resulted.

Another dough mix was prepared (IV identical to III) but without the heptane ascorbic acid system II. This mix was treated as III to yield control loaves.

Experimental and control loaves compared in loaf volume, color, and other parameters. They differed however in grain score, the experimental loaves averaging nine out of a maximum of ten, and the control loaves averaging eight.

EXAMPLE 6

Experimental loaves were prepared successfully as in Example 5, but substituting n-hexane for n-heptane.

EXAMPLE 7

Experimental loaves were prepared successfully as in Example 5, but substituting 80% aqueous glycerol for the water as solvent for the ascorbic acid to be solubilized.

EXAMPLE 8

Experimental loaves were prepared successfully as in Example 5, but sodium ascorbate was substituted for the ascorbic acid at 1.125 parts sodium ascorbate per one part ascorbic acid, by weight.

EXAMPLE 9

Experimental loaves were prepared successfully as in Example 5, but cysteine hydrochloride was substituted for ascorbic acid at 0.894 part cysteine hydrochloride per one part ascorbic acid, by weight.

EXAMPLE 10

Experimental loaves were prepared successfully as in Example 5, but isoascorbic acid was substituted for ascorbic acid.

EXAMPLE 11

Experimental loaves were prepared successfully as in Example 5, but sodium isoascorbate was substituted to ascorbic acid at 1.125 parts sodium isoascorbate per one part ascorbic acid.

EXAMPLE 12

Bread was prepared in a pilot automated process system based on AMF's Amflow system. A 50% flour sponge (I) was prepared containing:

|  | Lb. |
|---|---|
| Water | 57 |
| Patent flour (high protein) | 50 |
| Yeast | 3 |
| Yeast food | 0.75 |
| Sodium chloride | 0.50 |
| Sucrose | 1.00 |
| Mold inhibitor (Ca propionate) | 0.10 |
| Emulsifier | 0.10 |

This was fermented for 2½ hours at 84° F. with agitation.

The sponge (I) was metered into the automated system. At several places along the system the following were added:

Water—8 lb.
Sucrose—6 lb.
Milk solids (non-fat)—3 lb.
Sodium chloride—1.5 lb.
Oxidant (60/10 KBr:KI)—2.7 gm.
Flour—50 lb.
Shortening—3 lb.
System II of Example 5 this application—0.6 lb.

Resultant dough was panned, proofed to height and baked at 415° F. for 25 minutes. Experimental loaves resulted.

Control loaves were prepared in the same way, omitting the 0.6 lb. of System II, Example 5.

Again, the experimental loaves scored higher in grain than the control loaves. The important aspect of this experiment was the power requirement at the developer.

The control system required 300 r.p.m. The experimental system required 255 r.p.m.

Using this invention, one can incorporate ascorbic acid in the hexane, heptane or octane; thus:

+The advantage of decreasing mixing speed is combined with the textural benefits of the organic solvent.

++Ascorbic acid, hidden within micellar structures, is protected from oxidation by oxidative enzymes, by air during mixing and by traditional oxidizing agents added to the dough mix.

Instead of the surfactant called for in the examples, any other physiologically acceptable surfactant may be used such as one mentioned in the above list. Or, hexane, heptane and octane are interchangeable. The examples specifically include ascorbic acid and cysteine but other enediols and isomers used as reducing agents may be substituted in practicing the invention.

What is claimed:

1. A bread dough additive containing an ingestible reducing agent selected from the group consisting of ascorbic acid, isomers of ascorbic acid an systeine, a hydrocarbon selected from the group consisting of n-hexane, n-heptane and n-octane, a surfactant having hydrophobic and hydrophillic groups and selected from the group consisting of dioctyl sodium sulfosuccinate, triglycerol monooleate, decaglycerol dioleate, ethoxylated stearic acid, caprylic acid, lecithin, n-dodecylamine caproate, n-octadecylamine caproate, hexanolamine oleate, hexanolamine caproate, $\alpha$-monocaprin, $\alpha$-monolaurin, $\alpha$-monomyristin, $\alpha$-monostearin, zinc capyrylate, zinc laurate, nickel laurate, magnesium laurate, copper laurate, zinc myristate, zinc stearate, dinonylnaphthalene sulfonate, tripentyl methylbenzene sulfonate, polyethylene nonylphenol ether, dodecyl ammonium butyrate or dodecyl ammonium propionate, said surfactant being in a concentration between its critical micelle concentration and its maximum additive concentration in said hydrocarbon so that micelles are formed with the hydrophillic groups aggregated at the centers of the micelles, and water to form an aqueous solution of said reducing agent within the concentration that will be retained by the aggregated hydrophillic groups, said bread dough additive comprising per 100 ml. of the hydrocarbon, from 0.5 to 20 grams of said surfactant and the reducing agent being in a 10–40% by weight aqueous solution.

References Cited
UNITED STATES PATENTS

| 2,149,682 | 3/1939 | Jorgensen | 99—91 X |
| 3,117,929 | 1/1964 | McCoy et al. | 252—76 X |

A. LOUIS MONACELL, Primary Examiner

J. HOFFMAN, Assistant Examiner

U.S. Cl. X.R.

252—308